United States Patent
Park et al.

(10) Patent No.: US 8,681,304 B2
(45) Date of Patent: Mar. 25, 2014

(54) LIQUID CRYSTAL DISPLAY DEVICE WITH A LATERAL PATTERN PORTION FORMED ON A SIDE OF THE DATA LINE FOR IMPROVING A RUBBING DEFECT

(75) Inventors: Hae Jin Park, Gyeonggi-do (KR); Won Chul Sin, Gyeonggi-do (KR)

(73) Assignee: Hydis Technologies Co., Ltd., Gyeonggi-do (KR)

( * ) Notice: Subject to any disclaimer, the term of this patent is extended or adjusted under 35 U.S.C. 154(b) by 175 days.

(21) Appl. No.: 13/334,350

(22) Filed: Dec. 22, 2011

(65) Prior Publication Data

US 2012/0257154 A1 Oct. 11, 2012

(30) Foreign Application Priority Data

Apr. 6, 2011 (KR) .......................... 10-2011-0031783

(51) Int. Cl.
*G02F 1/1343* (2006.01)
*G02F 1/1337* (2006.01)

(52) U.S. Cl.
USPC ........... 349/142; 349/124; 349/125; 349/126; 349/141

(58) Field of Classification Search
USPC .......................... 349/142, 124, 125, 126, 141
See application file for complete search history.

(56) References Cited

U.S. PATENT DOCUMENTS

| | | | | |
|---|---|---|---|---|
| 6,801,287 B2* | 10/2004 | Kurahashi et al. | ............ | 349/141 |
| 6,897,930 B2* | 5/2005 | Nakayoshi et al. | ........... | 349/139 |
| 6,924,863 B2* | 8/2005 | Nishida et al. | ................ | 349/141 |
| 7,142,274 B2* | 11/2006 | Kitagawa et al. | ............ | 349/141 |
| 7,244,627 B2* | 7/2007 | Lee et al. | ......................... | 438/30 |
| 7,936,428 B2* | 5/2011 | Takahashi et al. | ............ | 349/141 |

FOREIGN PATENT DOCUMENTS

| | | | | |
|---|---|---|---|---|
| JP | 2006201197 A | | 8/2006 | |
| JP | 2006201197 A | * | 8/2006 | ............ G02F 1/1335 |
| KR | 10-20050113749 | | 12/2005 | |
| KR | 2007 0008882 A | | 1/2007 | |

* cited by examiner

*Primary Examiner* — Mike Qi
(74) *Attorney, Agent, or Firm* — Dority & Manning, P.A.

(57) ABSTRACT

Disclosed is a liquid crystal display device comprising a lower substrate, an upper substrate, and a liquid crystal layer interposed between the substrates and aligned in a predetermined rubbing direction, in which pixel regions are respectively defined by gate lines and data lines formed to intersect each other on the lower substrate, and a switching device is arranged in an intersecting portion of the gate line and the data line, the liquid crystal display device comprising: a lateral pattern portion formed on at least one side of the data line and formed zigzagging along an extending direction of the data line. With this, it is possible to effectively improve and prevent the rubbing defect that occurs in the stepped region of the data line during the rubbing process for alignment of liquid crystal.

5 Claims, 8 Drawing Sheets

LIQUID CRYSTAL DISPLAY DEVICE WITH A LATERAL PATTERN PORTION FORMED ON A SIDE OF THE DATA LINE FOR IMPROVING A RUBBING DEFECT

CROSS-REFERENCE TO RELATED APPLICATION

This application claims priority to and the benefit of Korean Patent Application No. 2011-0031783 filed in the Korean Intellectual Property Office on Apr. 6, 2011, the entire contents of which are incorporated herein by reference.

BACKGROUND OF THE INVENTION (a) Field of the Invention

The present invention relates to a liquid crystal display (LCD) device, and more particularly, to an LCD device in which only a data line's own structure is improved to effectively decrease a rubbing defect that occurs in a stepped region of the data line during a rubbing process for alignment of liquid crystal.

(b) Description of the Related Art

In general, a fringe field switching (FFS) mode LCD device has been proposed to improve a low aperture ratio and low transmittance that an in-plane switching (IPS) mode LCD device has.

FIG. 1 is a plan view showing a partial pixel region formed by a manufacturing process in a lower substrate of a conventional FFS mode LCD device, FIG. 2 is a cross-section view of FIG. 1, taken along line A-A', and FIG. 3 is a conceptual view showing abnormal arrangement of liquid crystal due to a rubbing defect in a stepped region of a data line of FIG. 1.

Referring to FIGS. 1 to 3, the conventional FFS mode LCD device broadly includes a lower substrate 10, an upper substrate (not shown), and a liquid crystal layer (not shown) interposed between the substrates. On the lower substrate 10, pixel regions are respectively defined by gate lines G and data lines 60 formed to intersect each other, and a thin film transistor (TFT) T is arranged as a switching device in an intersecting portion of the gate line G and the data line 60. Further, to adjust the amount of light transmittance by applying voltage to the liquid crystal layer, there are provided a transparent pixel electrode 40 within a pixel region, and a transparent common electrode 80 partially overlapping with and spaced apart from the transparent pixel electrode 40 with an insulating layer 70 therebetween.

Meanwhile, a process of manufacturing the FFS mode LCD device with the above configuration includes a rubbing process for liquid crystal alignment of the liquid crystal layer. As shown in FIGS. 2 and 3, a rubbing defect in a stepped region of the data line 60 causes abnormal alignment of the liquid crystal, different from a desired orientation. In this case, light leakage may occur.

In particular, when an angle between a rubbing direction and a data line is small (i.e., an acute angle), this phenomenon is significantly observed. Generally, in an FFS or a horizontal electric field mode, i.e., IPS mode, the rubbing process may have to be achieved at an acute angle to the data line in accordance with models. At this time, such a rubbing defect remarkably appears in a stepped region opposite to an orientation proceeding direction with respect to the data line.

To solve such a rubbing defect, the shape of pixel has been generally deformed at a certain angle in accordance with a rubbing direction. However, this method causes the whole pixel structure such as the data line 60 to be changed, and is thus disadvantageous in light of the aperture ratio and an efficiency per area.

SUMMARY OF THE INVENTION

Accordingly, the present invention is conceived to solve the forgoing problems, and an aspect of the present invention is to provide an LCD device in which only a data line's own structure is improved to effectively decrease a rubbing defect that occurs in a stepped region of the data line during a rubbing process for alignment of liquid crystal.

An exemplary embodiment of the present invention provides a liquid crystal display device including a lower substrate, an upper substrate, and a liquid crystal layer interposed between the substrates and aligned in a predetermined rubbing direction, in which pixel regions are respectively defined by gate lines and data lines formed to intersect each other on the lower substrate, and a switching device is arranged in an intersecting portion of the gate line and the data line, the liquid crystal display device including: a lateral pattern portion formed on at least one side of the data line and formed zigzagging along an extending direction of the data line.

The lateral pattern portion may be repetitively succeeded while including a plurality of first lateral patterns parallel to a rubbing direction, and a plurality of second lateral patterns making a predetermined angle with the first lateral patterns. Here, The second lateral patterns are formed to be substantially perpendicular to the first lateral patterns.

Also, an angle between the first lateral pattern and the extending direction of the data line is substantially more than 0 but less than 20 degrees.

Another exemplary embodiment of the present invention provides a liquid crystal display device including a lower substrate, an upper substrate, and a liquid crystal layer interposed between the substrates and aligned in a predetermined rubbing direction, in which pixel regions are respectively defined by gate lines and data lines formed to intersect each other on the lower substrate, and a switching device is arranged in an intersecting portion of the gate line and the data line, wherein the data line includes inclination includes respective inclination portions at lateral opposite sides with respect to an extending direction thereof, and at least one of the inclination portions is formed with a plurality of lateral pattern portions, the plurality of lateral pattern portions includes a plurality of inclination surfaces inclined to be parallel to a rubbing direction, and a plurality of second inclination surfaces inclined to be perpendicular to the rubbing direction, the first inclination surface and the second inclination surface are formed to share one side with each other, and the plurality of lateral pattern portions is successively and repetitively formed in the extending direction of the data line and overall forms a saw-toothed pattern. Here, the rubbing direction makes an angle of substantially more than 0 but less than 20 degrees with the extending direction of the data line.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Hereinafter, exemplary embodiments will be described in detail with reference to accompanying drawings. However, the following exemplary embodiments may be changed into various different forms, and the scope thereof is not limited by the following described exemplary embodiment. These exemplary embodiments are just given for more effectually explaining the present invention to a person having an ordinary skill in the art.

First, an exemplary embodiment of the present invention describes an FFS mode LCD device, but not limited thereto. Alternatively, the present invention may be applied to all the LCD device needing a rubbing process for alignment of liquid crystal, e.g., a horizontal electric field mode, i.e., IPS mode LCD device.

The FFS mode LCD device according to an exemplary embodiment of the present invention includes a lower substrate, an upper substrate, and a liquid crystal layer interposed between the substrates and aligned in a predetermined rubbing direction. On the lower substrate, pixel regions are respectively defined by gate lines and data lines formed to intersect each other, and a switching device is arranged in an intersecting portion of the gate line and the data line. Further, to adjust the amount of light transmittance by applying voltage to the liquid crystal layer, there are provided a transparent pixel electrode within a pixel region, and a transparent common electrode partially overlapping with and spaced apart from the transparent pixel electrode with an insulating layer therebetween.

Figure 4:
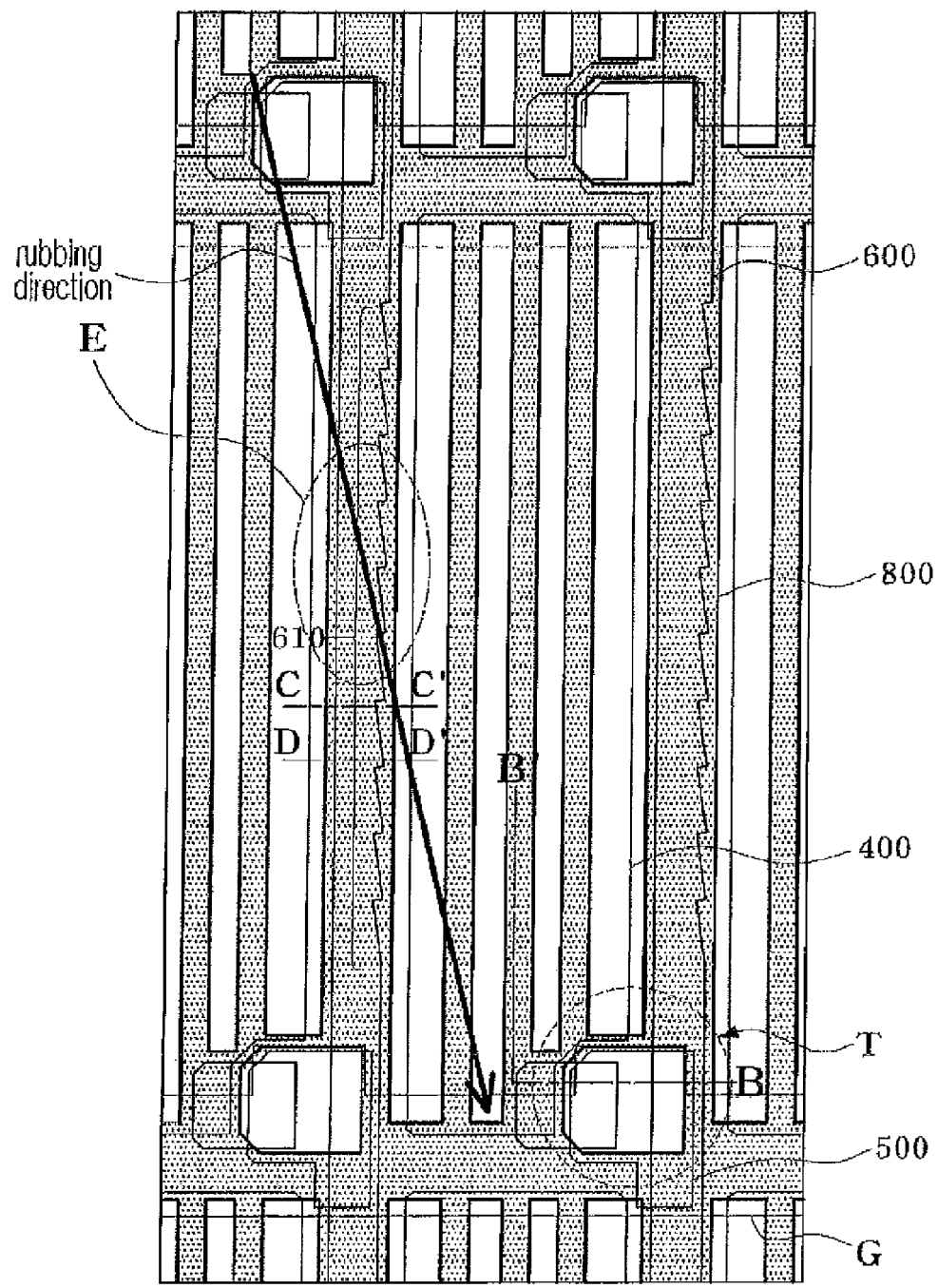
FIG. 4 is a plan view showing a partial pixel region formed by a manufacturing process in a lower substrate of an FFS mode LCD device according to an exemplary embodiment of the present invention.
Figure 5:
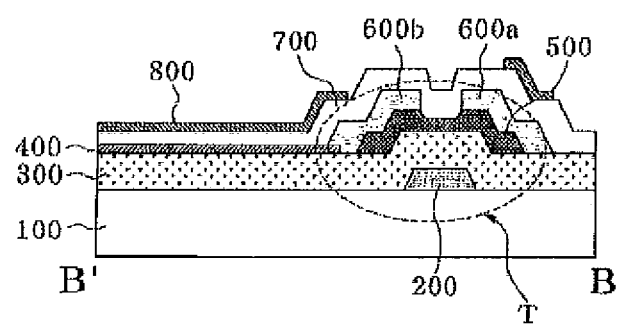
FIG. 5 is a cross-section view of FIG. 4, taken along line B-B'.
Figure 6:
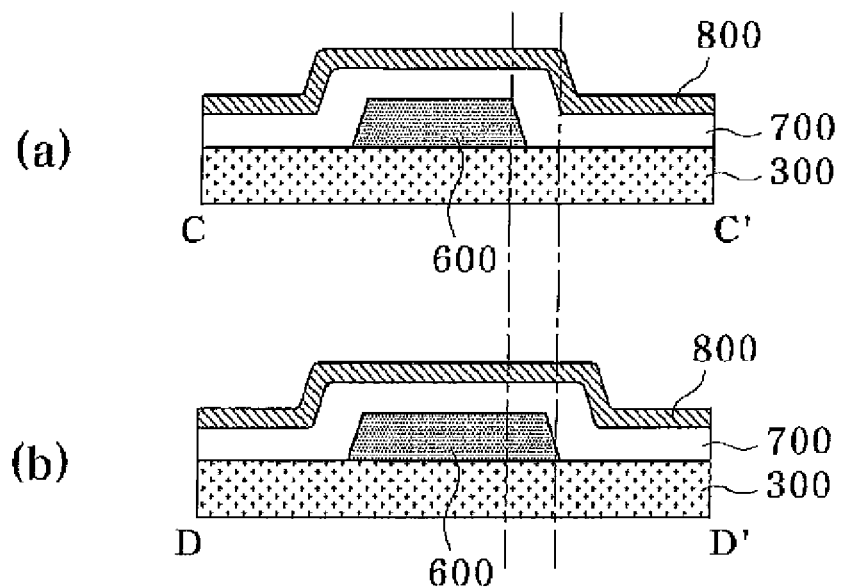
FIG. 6 is a cross-section view taken along line-C-C' and D-D' in FIG. 4.
Figure 7:
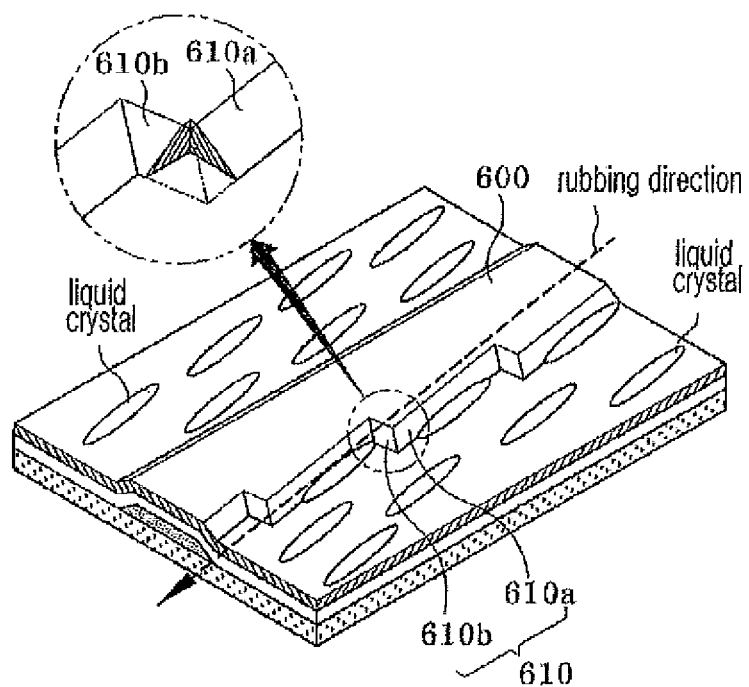
FIG. 7 is a enlarged schematic view of E of FIG. 4.

FIG. 4 is a plan view showing a partial pixel region formed by a manufacturing process in a lower substrate of an FFS mode LCD device according to an exemplary embodiment of the present invention, FIG. 5 is a cross-section view of FIG. 4, taken along line B-B', FIG. 6 is a cross-section view taken along line C-C' and D-D' in FIG. 4, and FIG. 7 is an enlarged view of E in FIG. 4.

Referring to FIGS. 4 to 7, the FFS mode LCD device according to an exemplary embodiment of the present invention includes a lower substrate 100 on which opaque metal gate lines G and data lines 600 intersect at right angles to form unit pixels. Within such a unit pixel region, a transparent common electrode 800 and a transparent pixel electrode 400 are arranged with an insulating layer 700 therebetween. For example, the transparent pixel electrode 400 is shaped like a plate and arranged on the same layer as the data line 600, and the transparent common electrode 800 is provided in the form of having a plurality of comb patterns due to patterning of a transparent conductive layer deposited on the insulating layer 700 and partially overlaps with the transparent pixel electrode 400.

On a gate electrode 200 of the gate line G, there are provided source/drain electrodes 600a and 600b, and an active pattern 500 where an a-Si layer and a n+ a-Si layer are sequentially deposited with a gate insulating layer 300 therebetween, thereby forming a thin film transistor (TFT) T. The drain electrode 600b is electrically connected to the transparent pixel electrode 400, so that a data signal can be applied to the unit pixel.

Meanwhile, the upper substrate is provided with color filters (not shown) through which colors of a screen are represented corresponding to respective pixel regions formed in the lower substrate 100, and includes no black matrix above the data line 600 as opposed to the conventional one. Also, the transparent common electrode has not been conventionally formed above the data line. However, according to an exemplary embodiment of the present invention, the transparent common electrode 800 is formed even above the data line 600.

From a cross-section view of the data line 600, the data line 600 is formed with a flat portion on the top thereof and inclination surfaces at opposite sides of the flat portion. Further, from a plan view of the lower substrate 100, at least one of the opposite inclination surfaces is formed with a zigzagged or saw-toothed lateral pattern portion 610. The lateral pattern portion 610 includes a plurality of first lateral patterns (or first lateral surfaces) 610a parallel to a rubbing direction, and a plurality of second lateral patterns (or second lateral surfaces) 610b perpendicular to the rubbing direction. The plurality of first lateral patterns 610a and the plurality of second lateral patterns 610b are alternately arranged in an extending direction of the data line 600 while sharing one side with each other, and thus substantially provided in the form of the zigzagged or saw-toothed pattern.

That is, the first lateral pattern 610a is formed so that a tangent between the first lateral pattern 610a and the flat portion of the data line can be parallel with the rubbing direction. Likewise, the second lateral pattern 610b is formed so that a tangent between the second lateral pattern 610b and the flat portion of the data line can be perpendicular to the rubbing direction.

Thus, in accordance with the shape of the data line 600, the insulating layer 700 and the transparent common electrode 800 formed on the top of the data line 600 are also shaped like the data line 600.

Here, an angle between the rubbing direction and the extending direction of the data line 600 may substantially be more than 0 but less than 20 degrees.

Accordingly, the present invention allows the data line 600 to have a repetitive zigzagged pattern, i.e., the saw-toothed rubbing pattern portion 610 so that the rubbing defect that conventionally occurs in the horizontal electric field mode LCD device can be solved without substantially changing the pixel structure, and the conventional shortcomings of changing the pixel's own structure can be compensated, thereby effectively solving the conventional problems.

Figure 1:
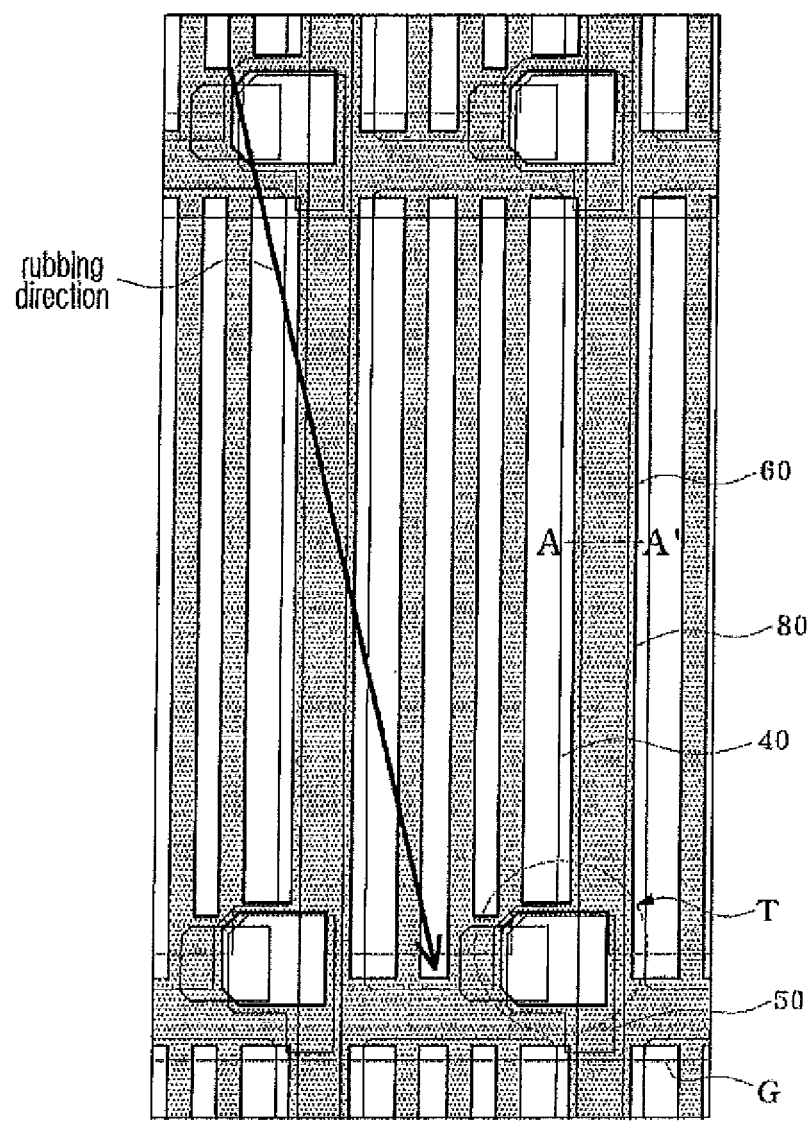
FIG. 1 is a plan view showing a partial pixel region formed by a manufacturing process in a lower substrate of a conventional FFS mode LCD device.
Figure 2:
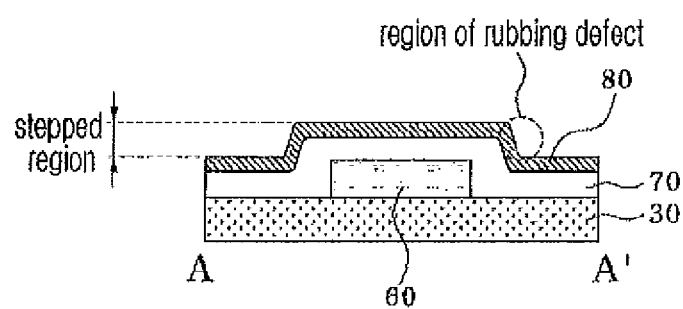
FIG. 2 is a cross-section view of FIG. 1, taken along line A-A'.

In other words, the rubbing defect occurs if the rubbing direction is an about 7 degree angle to the stepped region (see FIG. 2) of the data line 600 during the rubbing process of the liquid crystal. However, the rubbing defect hardly occurs if the rubbing direction is perpendicular or parallel to the structure of the stepped region.

Figure 3:
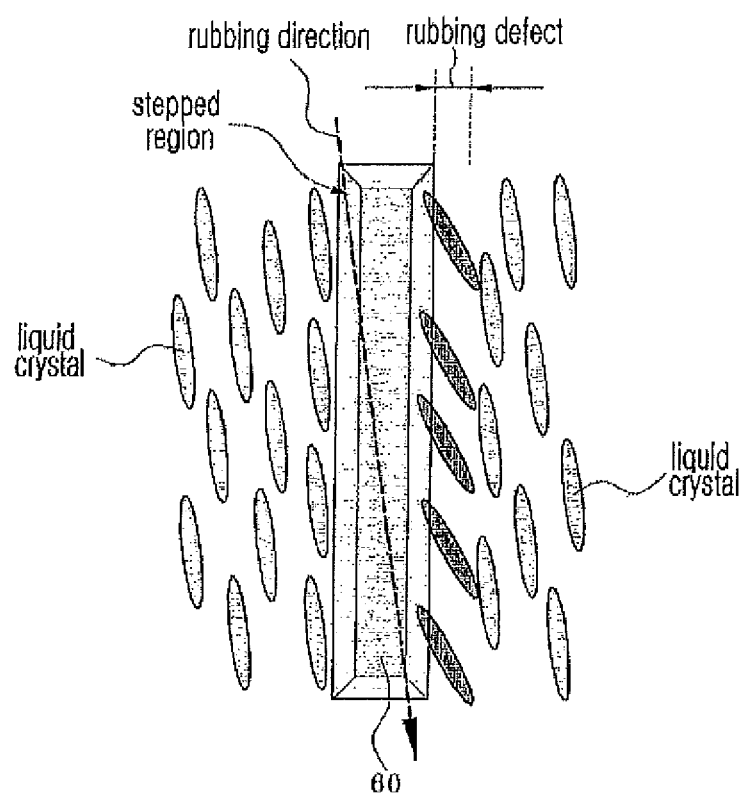
FIG. 3 is a conceptual view showing abnormal arrangement of liquid crystal due to a rubbing defect in a stepped region of a data line of FIG. 1.

For example, as shown in FIG. 3, in the case of the FFS mode LCD device of which an angle between the rubbing direction and the data line is about 7 degrees, the rubbing is performed at an angle of about 7 degrees along the data line 600, and thus the rubbing defect remarkably appears.

However, the structure of the data line 600 is voluntarily adjusted to be parallel or perpendicular to the rubbing direction, thereby minimizing the rubbing defect that occurs during the rubbing process.

Also, the present invention eliminates or decreases the abnormal arrangement region of the liquid crystal due to the rubbing defect, so that a typical black matrix (BM) region can be minimized to enhance an aperture ratio, and a problem that the liquid crystal's abnormal arrangement affects its neighbor arrangement can be also minimized.

Figure 8:
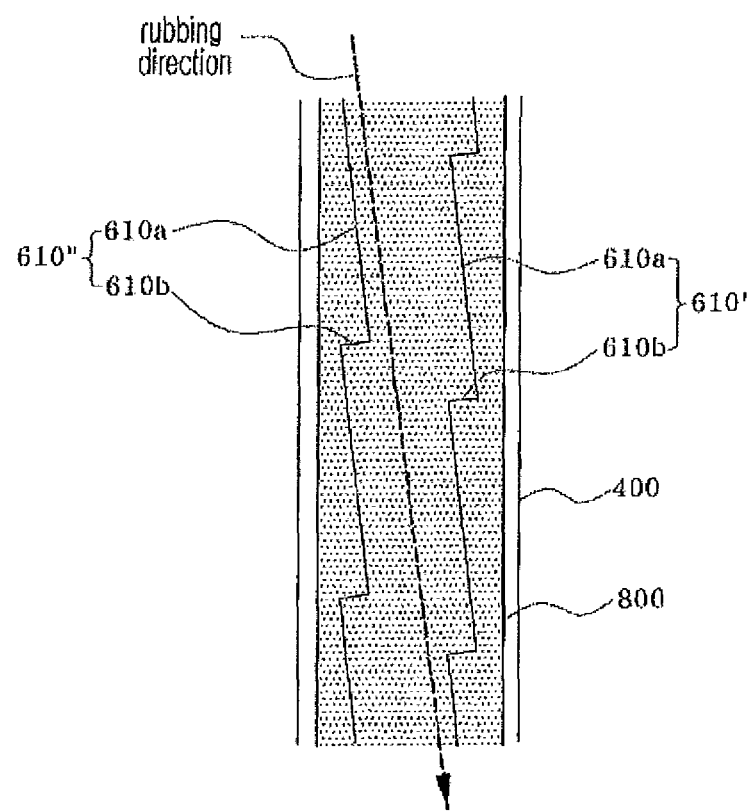
FIG. 8 is a partial enlarged view of each data line according to another example embodiment.

FIG. 8 is a partial enlarged view of each data line according to another example embodiment. Referring to FIG. 8, zigzag patterns, i.e., saw-toothed lateral patterns 610' and 610" are formed at opposite sides of each data line 600, so that the rubbing defect can be effectively decreased in both opposite sides of each data line 600, and selective use of the rubbing direction is also possible.

As described above, there is provided an LCD device in which only a data line's own structure is improved to effectively prevent a disclination that liquid crystal is not aligned in a stepped region of the data line during a rubbing process for alignment of liquid crystal.

Also, an abnormal arrangement region of liquid crystal due to the disinclination is eliminated or decreased while aligning the liquid crystal, thereby minimizing a typical black matrix (BM) region and thus increasing an aperture ratio.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display device comprising a lower substrate, an upper substrate, and a liquid crystal layer interposed between the substrates and aligned in a predetermined rubbing direction, in which pixel regions are respectively defined by gate lines and data lines formed to intersect each other on the lower substrate, and a switching device is arranged in an intersecting portion of the gate line and the data line, the liquid crystal display device comprising:

a lateral pattern portion formed on at least one side of the data line and formed zigzagging along an extending direction of the data line, wherein the lateral pattern portion comprises a plurality of first lateral patterns parallel to a rubbing direction, and a plurality of second lateral patterns making a predetermined angle with the first lateral patterns.

2. The liquid crystal display device according to claim 1, wherein the second lateral patterns are formed to be substantially perpendicular to the first lateral patterns.

3. A liquid crystal display device comprising a lower, substrate an upper substrate, and a liquid crystal layer interposed between the substrates and aligned in a predetermined rubbing direction, in which pixel regions are repectively defined by gate lines and data lines formed to intersect each other on the lower substrate, and a switching device is arranged in an intersecting portion of the gate line and the data line, the liquid crystal display device comprising:

a lateral pattern portion formed on at leas one side of the data line and formed zigzagging along an extending direction of the data line, wherein an angle between the rubbing direction and the extending direction of the data line is substantially more than 0 but less than 20 degrees.

4. A liquid crystal display device comprising a lower substrate, an upper substrate, and a liquid crystal layer interposed between the substrates and aligned in a predetermined rubbing direction, in which pixel regions are respectively defined by gate lines and data lines formed to intersect each other on the lower substrate, and a switching device is arranged in an intersecting portion of the gate line and the data line, wherein the data line comprises a plurality of first lateral surface portion substantially parallel to the predetermined rubbing direction and a plurality of second lateral surface portion making a predetermined angle with the first lateral surface portion, respectively formed on at least one side of the data line with respect to an extending direction thereof, the plurality of first lateral surface portion and the plurality of second lateral surface portion are respectively arranged alternately in the extending direction of the data line, while sharing each of them one side in a sawtooth shape as a whole.

5. The liquid crystal display device according to claim 4, wherein the rubbing direction makes an angle of substantially more than 0 but less than 20 degrees with the extending direction of the data line.

* * * * *